US009609159B2

(12) United States Patent
Hatayama et al.

(10) Patent No.: US 9,609,159 B2
(45) Date of Patent: Mar. 28, 2017

(54) SHEET CONVEYANCE DEVICE

(71) Applicants: Koji Hatayama, Kanagawa (JP);
Yasunobu Youda, Kanagawa (JP);
Yohei Osanai, Kanagawa (JP);
Tatsuaki Nagano, Kanagawa (JP);
Kazushige Kawamura, Kanagawa (JP);
Toshiyuki Horikawa, Kanagawa (JP)

(72) Inventors: Koji Hatayama, Kanagawa (JP);
Yasunobu Youda, Kanagawa (JP);
Yohei Osanai, Kanagawa (JP);
Tatsuaki Nagano, Kanagawa (JP);
Kazushige Kawamura, Kanagawa (JP);
Toshiyuki Horikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/927,860

(22) Filed: Oct. 30, 2015

(65) Prior Publication Data

US 2016/0127590 A1    May 5, 2016

(30) Foreign Application Priority Data

Oct. 30, 2014 (JP) ................. 2014-221795

(51) Int. Cl.
*H04N 1/04* (2006.01)
*H04N 1/00* (2006.01)
(Continued)

(52) U.S. Cl.
CPC .......... *H04N 1/00631* (2013.01); *B65H 1/04* (2013.01); *B65H 5/06* (2013.01); *B65H 5/26* (2013.01);
(Continued)

(58) Field of Classification Search
CPC ......... H04N 2201/0081; H04N 1/0057; H04N 1/00588; H04N 1/00602; H04N 1/00631; H04N 1/32026; H04N 1/0062
(Continued)

(56) References Cited

U.S. PATENT DOCUMENTS

| 5,788,227 A * | 8/1998 | Hendrix ................. B65H 5/068 |
| | | 271/184 |
| 2005/0129440 A1 * | 6/2005 | Nagata ............... H04N 1/00567 |
| | | 399/405 |
| 2006/0256391 A1 * | 11/2006 | Eom .................. H04N 1/00326 |
| | | 358/305 |
| 2009/0237752 A1 * | 9/2009 | Patterson ............. H04N 1/0057 |
| | | 358/498 |

(Continued)

FOREIGN PATENT DOCUMENTS

| JP | 2011-046515 | 3/2011 |
| JP | 2011-086988 | 4/2011 |
| JP | 2012-129668 | 7/2012 |

*Primary Examiner* — Negussie Worku
(74) *Attorney, Agent, or Firm* — Harness, Dickey & Pierce, P.L.C.

(57) ABSTRACT

A sheet conveyance device includes a sheet mount on which a standard-sized sheet is mountable; a first conveyor to bring in the sheet from the mount, convey the sheet through a reverse conveyance path such that the sheet passes through a specific operation position, and eject the sheet into a sheet ejection area outside the mount; and a second conveyor to bring in a hard sheet with a higher bending rigidity than the sheet from one end of a straight conveyance path along a plane passing through the specific position of the reverse path, and eject the hard sheet conveyed along the straight path from another end of the straight path at a sheet ejection area side. The mount includes a hard sheet ejection port to let through at least a leading edge portion of the hard sheet to be ejected from the second conveyor in a sheet ejection direction.

17 Claims, 7 Drawing Sheets

(51) Int. Cl.
*B65H 5/26* (2006.01)
*B65H 29/58* (2006.01)
*B65H 1/04* (2006.01)
*B65H 5/06* (2006.01)

(52) U.S. Cl.
CPC ......... *B65H 29/58* (2013.01); *H04N 1/00588* (2013.01); *H04N 1/00591* (2013.01); *B65H 2301/1321* (2013.01); *B65H 2402/442* (2013.01); *B65H 2402/443* (2013.01); *B65H 2405/111* (2013.01); *B65H 2405/115* (2013.01); *B65H 2405/3321* (2013.01); *B65H 2407/21* (2013.01); *B65H 2511/214* (2013.01); *B65H 2515/81* (2013.01); *B65H 2701/1914* (2013.01); *B65H 2801/39* (2013.01)

(58) Field of Classification Search
USPC ....... 358/474, 498, 403, 444; 271/9.02, 121, 271/3.14, 9.05, 162, 186, 225; 338/16, 338/21, 297, 345, 407, 82
See application file for complete search history.

(56) References Cited

U.S. PATENT DOCUMENTS

| | | | |
|---|---|---|---|
| 2012/0104676 A1* | 5/2012 | Hatayama | B65H 5/062 271/3.2 |
| 2012/0105921 A1* | 5/2012 | Ikari | H04N 1/00005 358/474 |
| 2013/0222826 A1* | 8/2013 | Osanai | G03G 15/602 358/1.12 |
| 2013/0335790 A1* | 12/2013 | Narai | H04N 1/0249 358/497 |
| 2014/0063574 A1* | 3/2014 | Uchida | H04N 1/2032 358/498 |
| 2014/0092454 A1* | 4/2014 | Nakayama | H04N 1/00602 358/498 |
| 2014/0376014 A1* | 12/2014 | Hatayama | H04N 1/0053 358/1.12 |
| 2015/0341515 A1* | 11/2015 | Youda | H04N 1/00602 358/498 |

* cited by examiner

SHEET CONVEYANCE DEVICE

CROSS-REFERENCE TO RELATED APPLICATION

This patent application is based on and claims priority pursuant to 35 U.S.C. §119(a) to Japanese Patent Application No. 2014-221795, filed on Oct. 30, 2014 in the Japan Patent Office, the entire disclosure of which is hereby incorporated by reference herein.

BACKGROUND

Technical Field

Aspects of the present disclosure relate to a sheet conveyance device, more specifically, a sheet conveyance device that is suited for conveyance of document sheets for image reading and allows straight conveyance of sheets difficult to bent in particular.

Related Art

Sheet conveyance-type image reading devices such as document scanners, multifunction peripherals including such image reading devices, and other multifunction peripheral devices are equipped with sheet conveyance devices to convey automatically document sheets along a predetermined conveyance path to feed the document sheets, read images from the document sheets, and eject the document sheets.

In such sheet conveyance devices, the sheet conveyance path is straightened to allow feeding of many types of documents (different in thickness, size, sheet type, or the like) and support difficult-to-bend hard documents with high bending rigidity such as driver's licenses or ID cards (identity cards).

There have been conventionally proposed sheet conveyance devices that allow image reading from both bendable normal document sheets and difficult-to-bend hard document sheets.

SUMMARY

In an aspect of this disclosure, there is provided a sheet conveyance device that includes a sheet mount, a first conveyor, and a second conveyor. A standard-sized sheet is mountable on the sheet mount. The first conveyor brings in the sheet from the sheet mount, conveys the sheet through a reverse conveyance path such that the sheet passes through a specific operation position, and ejects the sheet into a sheet ejection area outside the sheet mount. The second conveyor brings in a hard sheet with a higher bending rigidity than the sheet from one end of a straight conveyance path along a plane passing through the specific operation position of the reverse conveyance path, and ejects the hard sheet conveyed along the straight conveyance path from another end of the straight conveyance path at the sheet ejection area side. The sheet mount includes a hard sheet ejection port to let through at least a leading edge portion of the hard sheet to be ejected from the second conveyor in a sheet ejection direction.

In another aspect of this disclosure, there is provided an image reading device including the sheet conveyance device. The image reading device performs an image reading operation to read an image from the sheet or the hard sheet at the specific operation position.

In still another aspect of this disclosure, there is provided an image forming apparatus includes the image reading device and an image forming device. The image forming device forms an image to be output to an outside of the image forming apparatus, according to the image read with the image reading device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 4A indicates a stationary document reading mode, FIG. 4B indicates a reading mode switching operation, and FIG. 4C indicates a moving document reading mode;

Figure 1:
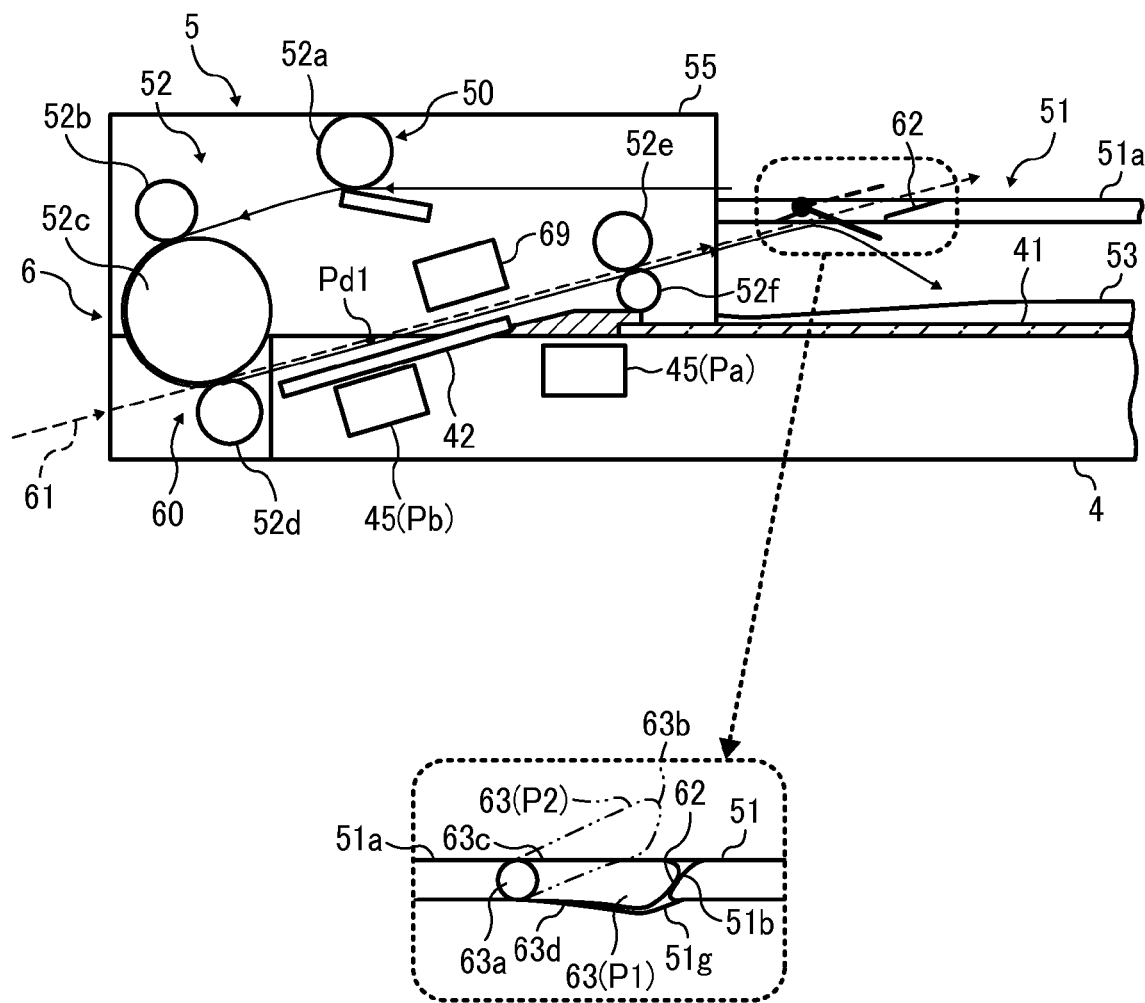
FIG. 1 is a schematic view of a configuration of a portion of an image forming apparatus including a sheet conveyance device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

For example, a sheet conveyance device performs almost straight conveyance for small-sized hard documents while the sheet conveyance device may have a conveyance path for hard documents bent in an almost dogleg shape.

Accordingly, the sheet conveyance device has the single-side image reading position shifted from a normal reading height, and may cause degradation in read images even though the device barely allows reading methods with an illumination and a deep-focus reducing optical system.

In addition, if a contact image sensor (CIS) is employed in the reading device with the bent conveyance path, the depth of focus is forced to be very low due to device characteristics, which may result in unsatisfying image quality.

Alternatively, a sheet conveyance device is provided with a document table for mounting normal document sheets, a sheet ejection tray for stacking document sheets after image reading, and a separate sheet ejection tray for small-sized hard documents. Accordingly, it may be difficult to remove small-sized hard documents from the sheet ejection tray for small-sized hard documents by the interference of the sheet ejection tray for normal document sheets and other objects adjacent to the device. For ease of removing the small-sized hard documents, the positions of the sheet ejection tray and the document table for normal document sheets need to be heightened, which may leads to increase in the height of the entire device To handle this issue, it is conceivable to dispose a sheet ejection tray for ejecting document sheets after image reading below a document table for mounting the normal document sheets such that the small-sized hard documents can be stacked in that sheet ejection tray, for example. In this case, however, the document table needs to be vertically separated from the conveyance path such that hard documents, such as cards which are difficult to be bent, can avoid contacting the document table to cause a conveyance failure. This may also bring about an increase in the height of the entire device.

As described below, according to at least one embodiment of the present disclosure, it is possible to provide a sheet conveyance device that allows straight conveyance without increase in device height, and provide an image reading device and an image forming apparatus including the conveyance device with excellent operability and image quality.

Referring now to the drawings, embodiments of the present disclosure are described below. In the drawings for explaining the following embodiments, the same reference codes are allocated to elements (members or components) having the same function or shape and redundant descriptions thereof are omitted below.

First Embodiment

FIGS. 1 to 6 illustrate a first embodiment of a sheet conveyance device according to the present disclosure, an image reading device and an image forming apparatus including the sheet conveyance device.

First, a configuration of this embodiment will be described.

In this embodiment, the sheet conveyance device in the present disclosure is applied to an auto document feeder of a digital multifunction peripheral (image forming apparatus) using an electrophotographic method, an inkjet recording method, or any other method.

The digital multifunction peripheral 1 has the functions of copier, printer, facsimile machine, scanner, and the like, and records a full color image or a monochromatic image on a transfer sheet and outputs the same in a predetermined data form, based on input data such as read image data. However, the image reading device and the image forming apparatus including the sheet conveyance device in the present disclosure may merely perform the function of image reading from moving documents.

Figure 2:
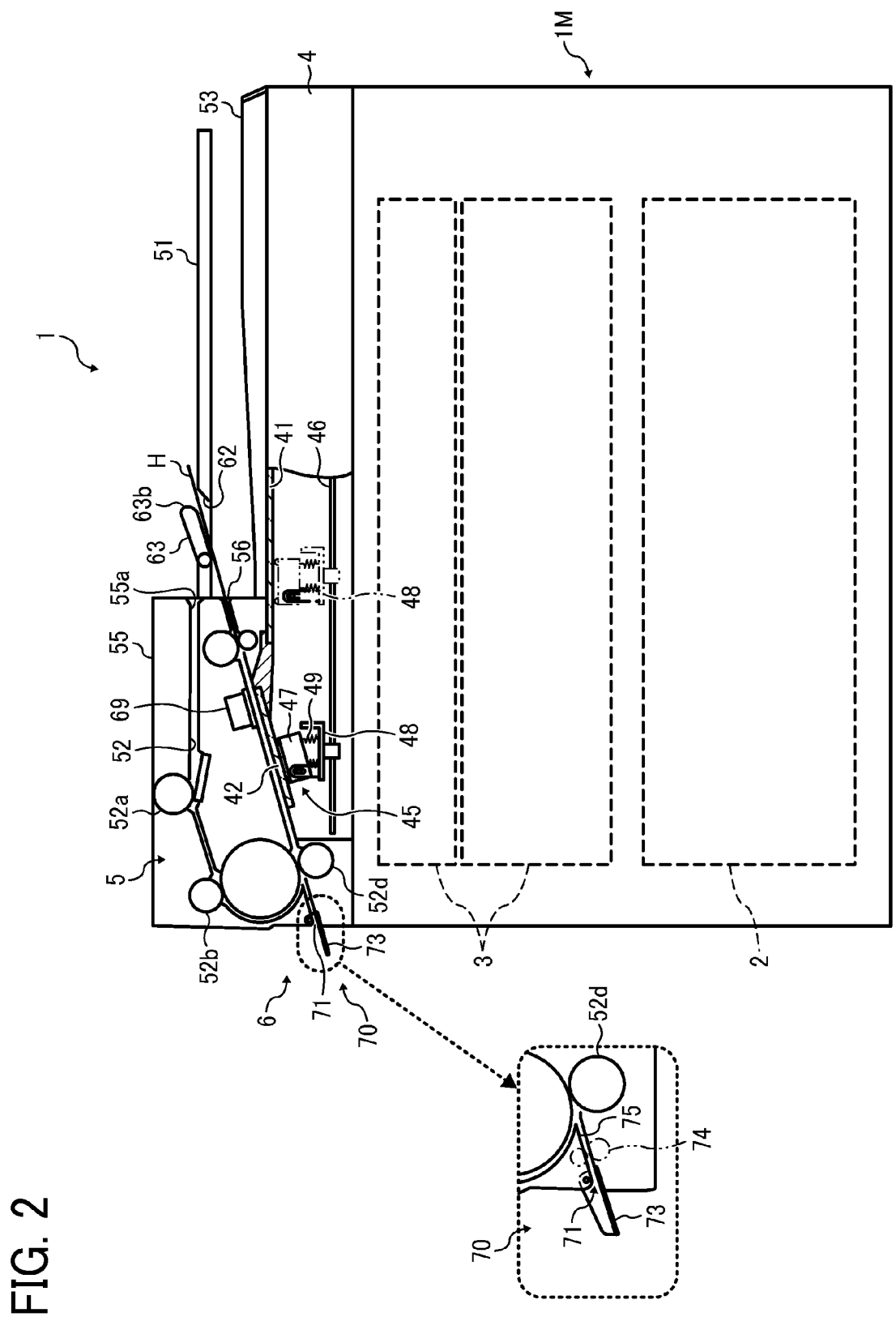
FIG. 2 is a schematic view of a configuration including a partial cross section of the image forming apparatus according to the first embodiment of the present disclosure.

As illustrated in FIGS. 1 and 2, the digital multifunction peripheral 1 includes an apparatus body 1M having a sheet feed section 2, an image forming section 3, and an image reading section 4, and an auto document feeder (ADF) 5 as a sheet conveyance device disposed on the apparatus body 1M. The image reading section 4 and the ADF 5 constitute an image reading device 6.

The sheet feed section 2 has a plurality of sheet feed trays that stores cut-sheet recording sheets and a plurality of paired sheet feed rollers that pick up recording sheets from any of the sheet feed trays, for example. The sheet feed section 2 also has a sheet feed path with various rollers that convey the recording sheets from any of the paired sheet feed rollers to a predetermined image forming position in the image forming section 3.

The image forming section 3 serving as an image forming device includes an exposure unit, a plurality of photoconductor drums, a developing device using toners of four colors of cyan (C), magenta (M), yellow (Y), and black (K), a transfer belt, a secondary transfer unit, a fixing unit, and the like.

The image forming section 3 exposes the photoconductor drums to light by the exposure unit to form electrostatic latent images on the photoconductor drums based on the image read by the image reading device 6, and supplies toners and develops the latent images on the photoconductive drums by the developing units for the individual colors in the developing device, for example. The image forming section 3 then performs a primary transfer of the toner images on the photoconductive drums onto the transfer belt, and performs a secondary transfer onto the recording sheet at the secondary transfer unit, and then heats and presses the toner images on the recording sheet by the fixing unit to fix the toner image to the recording sheet, thereby forming a color image.

The image reading device 6 is switchable between a DF scanner mode (conveyed-document reading mode) in which to read a document image during automatic conveyance and a flat head scanner mode (mounted document reading mode) in which to read an image from a document mounted on a flat exposure glass.

In flat head scanner mode, the image reading section 4 reads a document image by irradiating with light an image surface of a document (for example, a document sheet, a cardboard, a book, or the like) on a flat head exposure glass 41 and converting reflection light from the image surface into an image signal.

In the DF scanner mode, the ADF 5 separates documents sheets one by one from a document sheet bundle stacked on a document table 51 as a sheet mount, enters the same into a document feed path 52, and then conveys the same along the document feed path 52. During the conveyance, the document sheets partially face in sequence a DF exposure glass 42 on the upper side of the image reading section 4 from the upstream side of the conveyance direction. That is, the image reading device 6 performs the function of DF scanner by reading sequentially images from the document sheets conveyed by the ADF 5 on the DF exposure glass 42 of the image reading section 4.

The ADF 5 is attached to the back part on the upper side of the apparatus body 1M (the part on the rear side) via an opening-and-closing mechanism such as a hinge. The ADF 5 can be set in an open position to open above the flat head exposure glass 41 relative to the apparatus body 1M and in a closed position to press the document against the flat head exposure glass 41.

Figure 3:
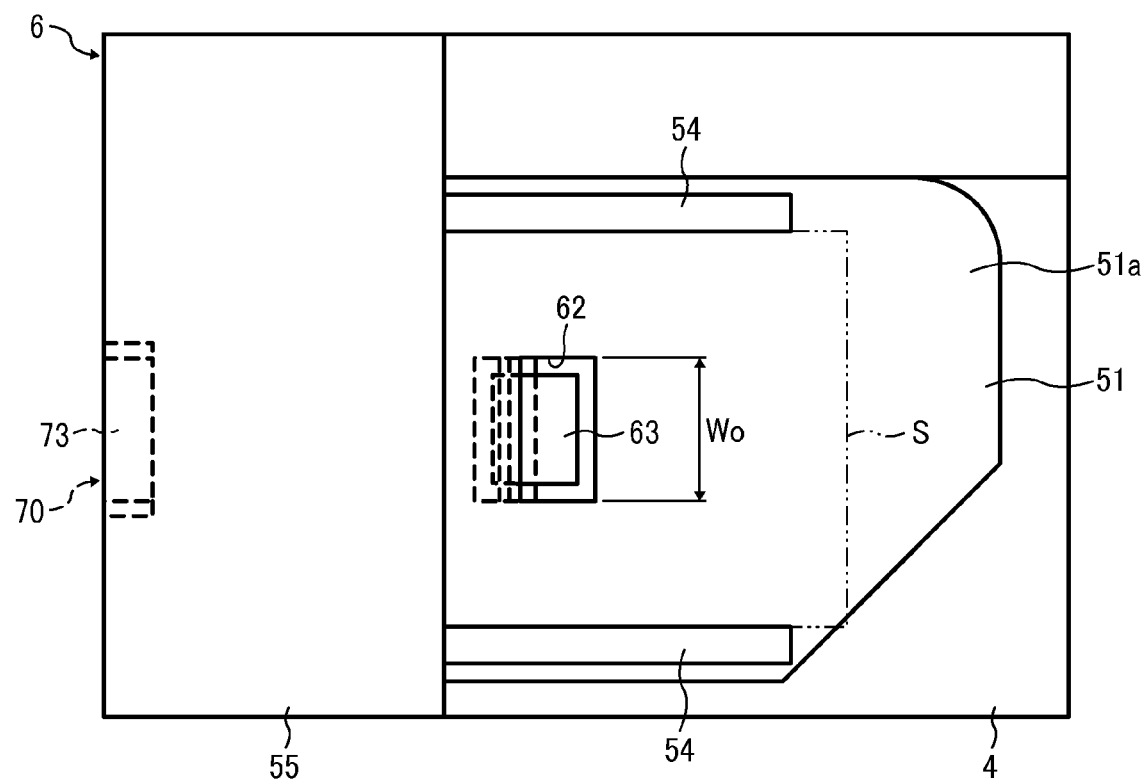
FIG. 3 is a top view of the image forming apparatus according to the first embodiment of the present disclosure.

As illustrated in FIG. 3, the document table 51 has a pair of movable right and left side guide plates 54 that positions a document sheet S set in the ADF 5 in a sheet width direction perpendicular to a sheet feed direction. These side guide plates 54 relatively approach to and move away from each other to align the document table 51 and the document sheet S in the center along the width. Alternatively, the side guide plates 54 may be disposed such that one edge of the document sheet S contacts one edge of the document table 51 and only the other edge of the document sheet S is movable.

The ADF 5 is covered with a cover 55 capable of being opened and closed at least at the upper side. The cover 55 forms a sheet feed port 55a at the upper side near the end portion at the sheet feed side of the document table 51 such that the leading edges of the document sheets S enter into the cover. The cover 55 also covers the upper side of the leading edge portion of the document table 51 such that the leading edge portion of the document table 51 is stored inside beyond the sheet feed port 55a. The ADF 5 forms a main guide portion constituting a conveyance passage in the document feed path 52 ranging from the sheet feed port 55a to an ejection port 56 by a rib formed in the cover 55 or the like.

When the image reading device 6 serves as a flat head scanner and a document sheet to be read is mounted on the flat head exposure glass 41, the flat head exposure glass 41 faces the image surface of the document sheet (hereinafter, referred to as first document). When the image reading device 6 serves as a DF scanner, the DF exposure glass 42 faces the image surface of a document sheet passing through a predetermined reading position in the document feed path 52 (hereinafter, referred to as second document). The DF exposure glass 42 is inclined to form a preset inclination angle θ with respect to the flat head exposure glass 41.

Figure 4A:
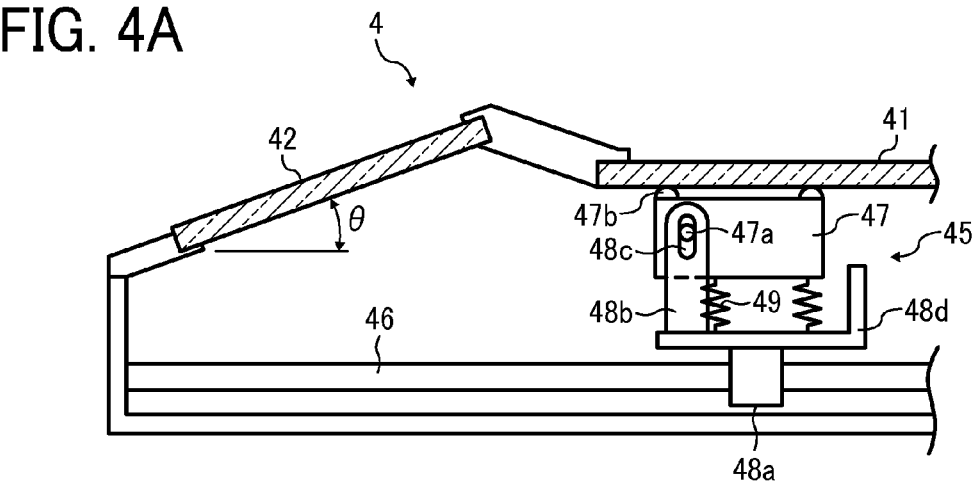
FIGS. 4A through 4C are illustrations of an operation for switching reading modes of an image reading unit at the image forming apparatus body according to the first embodiment of the present disclosure.
Figure 4B:
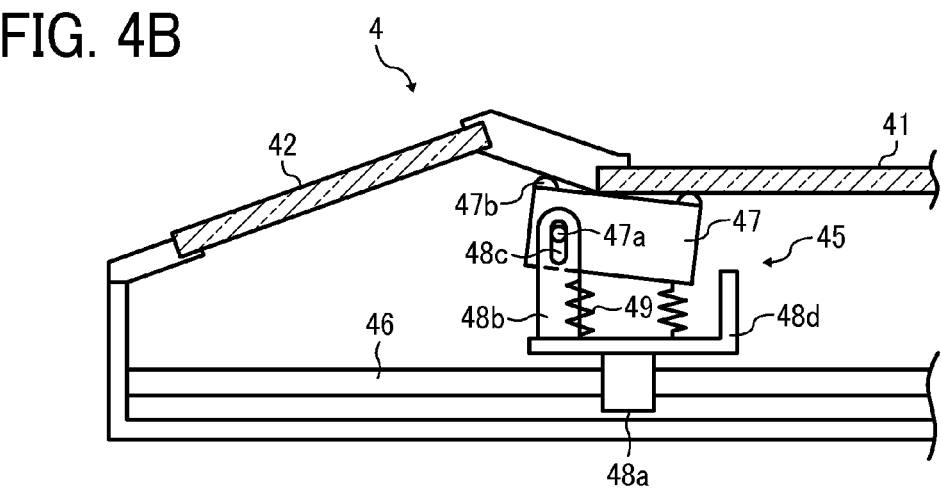
Figure 4C:
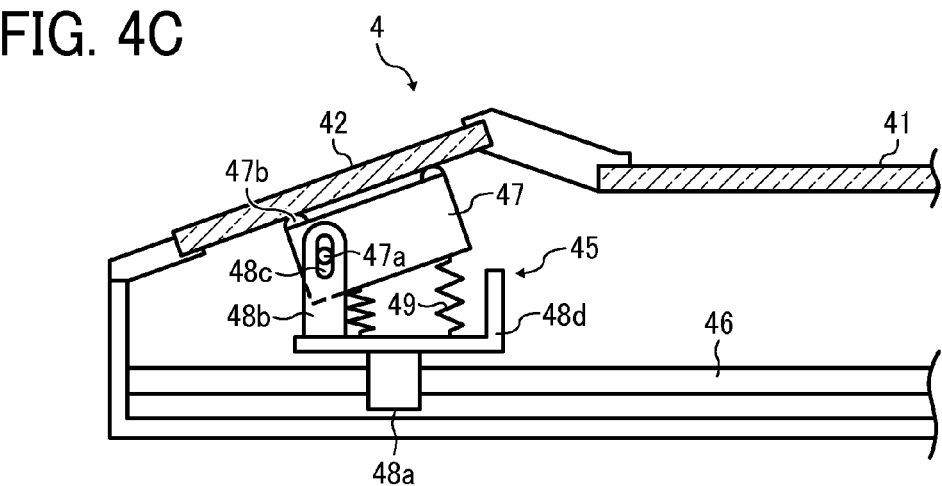

The image reading section 4 includes therein a first reading unit 45 (reading unit) and a guide rod 46 extended along the horizontal direction in FIGS. 4A through 4C.

The first reading unit 45 is composed of a unitary optical scanning unit 47, a bracket 48 holding the unitary optical scanning unit 47, and a plurality of compression coil springs 49 (elastic members) incorporated in a compressed state between the unitary optical scanning unit 47 and the bracket 48.

The unitary optical scanning unit 47 is composed of a contact image sensor in which a unity-magnification image forming a roof minor lens array, an optical-path separation mirror, a unify-magnification image sensor, an illumination light source, and the like are held in a molded frame, for example. The unitary optical scanning unit 47 can perform line scanning on an image in a main scanning direction at a high resolution. The unitary optical scanning unit 47 is arranged to have a high focal depth supporting image reading from a book document or the like. The unitary optical scanning unit 47 is not limited to a specific method as far as the unitary optical scanning unit 47 can support a DF scanner and a flat head scanner. The main scanning direction is parallel to both of the top surface of the flat head exposure glass 41 and the top surface of the DF exposure glass 42.

The bracket 48 has a lower slider portion 48a supported by the guide rod 46, a pair of holding arms 48b holding the unitary optical scanning unit 47, and a bracket body 48d to which the lower slider portion 48a and the pair of holding arms 48b are integrally attached. The lower slider portion 48a is composed of a cylindrical body fixed to the lower portion of the bracket body 48d at the center along the longitudinal direction. The pair of holding arms 48b is formed by a pair of plate bodies that protrudes in the upward direction in FIGS. 4A through 4C at the edge sides of the bracket body 48d. The pair of holding arms 48b has vertically long holes (oval holes) 48c to hold edge projections 47a of the unitary optical scanning unit 47 projecting vertically from edge surfaces, such that the edge projections 47a can be held so as to be changeable in posture around a longitudinal axial line and displaceable in the vertical direction.

The plurality of compression coil springs 49 are arranged to press the lower surface portion of the unitary optical scanning unit 47 at a plurality of locations in the main scanning direction toward the upper side (the flat head exposure glass 41 side and the DF exposure glass 42 side).

The unitary optical scanning unit 47 has at the upper part rectangular and annular upper slider portions 47b contacting the lower surface of at least one of the flat head exposure glass 41 and the DF exposure glass 42 and sliding on the lower surface smoothly in a sub-scanning direction. The upper slider portions 47b may be projections extended along the longitudinal direction or the short direction of the unitary optical scanning unit 47 and separated from each other in the direction perpendicular to the extended direction. The upper slider portions 47b may be a plurality of hemispherical projections or the like. In either case, the upper slider portions 47b are preferably formed from a material having a low coefficient of friction and excellent sliding properties without lubrication relative to the lower surfaces of the flat head exposure glass 41 and the DF exposure glass 42 or the guide surfaces substituting for the lower surfaces.

The unitary optical scanning unit 47 is movably guided in the sub-scanning direction by the guide rod 46 disposed under the bracket 48. According to the position in the sub-scanning direction, the unitary optical scanning unit 47 contacts slidably the flat head exposure glass 41 and/or the DF exposure glass 42 at the upper side of the position. Accordingly, the first reading unit 45 is restricted in inclination around the axis of the guide rod 46 although the first reading unit 45 is movable along the guide rod 46.

The first reading unit 45 performs line scanning on the image surface of a document on the flat head exposure glass 41 in the main scanning direction and moves in the sub-scanning direction to read the image from the document. The first reading unit 45 also performs line scanning on the image of a conveyed document passing on the DF exposure glass 42 in the main scanning direction to read the image from the document.

The image reading section 4 includes therein an endless loop-like timing belt to which the bracket 48 of the first reading unit 45 is fixed at one point in the circumferential direction. The image reading section 4 also includes therein a plurality of timing pulleys on which the timing belt is hung without slack and a motor for rotating one of the timing pulleys.

In the case of performing a reading operation in the flat head scanner mode, the first reading unit 45 moves from its home position to one end of the sub-scanning direction, for example, from its home position near the stop position shown by solid lines in FIG. 1 to the right side in FIG. 1. Then, the first reading unit 45 performs line scanning at each slight movement distance by the unitary optical scanning unit 47 to read the image from the surface (lower surface) of the document mounted on the flat head exposure glass 41. Upon completion of the reading operation, the first reading unit 45 returns to the home position.

In the case of performing a reading operation in the DF scanner mode, the first reading unit 45 moves from its home position to the lower side of the DF exposure glass 42 as shown by solid lines in FIG. 2. Specifically, the first reading unit 45 moves from the home position to the other end of the sub-scanning direction by a preset distance, stops under the DF exposure glass 42, and then reads the image from the surface of the conveyed document passing on the DF exposure glass 42.

The first reading unit 45 is movable in the sub-scanning direction and is capable of being positioned under the flat head exposure glass 41 and under the DF exposure glass 42. According to the position in the sub-scanning direction, the unitary optical scanning unit 47 switches between a first horizontal reading posture in which to read an image through the flat head exposure glass 41 and a second reading posture in which to read an image through the DF exposure glass 42.

The ADF 5 includes the document table 51 as a document table on which standard-sized sheets can be mounted, the document feed path 52 that conveys document sheets such that images can be read from the document sheets, and a sheet ejection tray 53 that stacks the document sheets after image reading. The document table 51 and the sheet ejection tray 53 are vertically disposed on top of the other for the purpose of size reduction such that at least some portions of the two are separated from each other.

Figure 5:
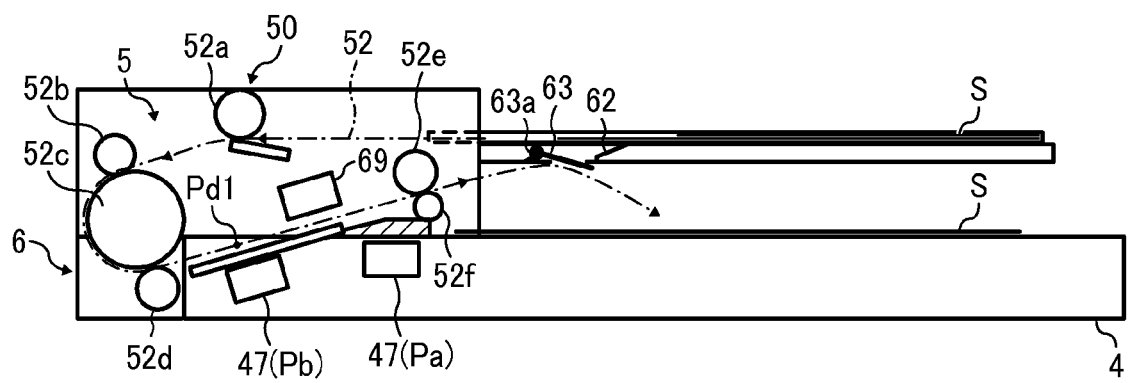
FIG. 5 is an illustration of a sheet ejection state when normal document sheets are read by the image forming apparatus including the sheet conveyance device according to the first embodiment of the present disclosure.

As illustrated in FIG. 5, the ADF 5 has a separation unit 52*a* that separates the document sheets S one by one from the top of a sheet bundle mounted on the document table 51 and enters the same into the document feed path 52 folded back to allow reverse conveyance. The ADF 5 reverses the separated and entered document sheets S so that these sheets turn over, and conveys the document sheets S through the document feed path 52 such that the document sheets S pass through a predetermined reading operation position Pd1 (specific operation position) on the top surface of the DF exposure glass 42. The document feed path 52 has a plurality of conveyance rollers 52*b*, 52*c*, and 52*d* for such conveyance, and has paired sheet ejection rollers 52*e* and 52*f* on the downstream side of the conveyance rollers 52*b*, 52*c*, and 52*d*. The number and disposition places of these conveyance rollers and sheet ejection rollers can be set as appropriate depending on path setting conditions for the document feed path 52, the length of the minimum-sized document sheet S along the document feed direction, and the like.

When the unitary optical scanning unit 47 is located at the position shown by solid lines in FIG. 2, the first reading unit 45 repeatedly performs line scanning on images in the conveyed document sheets S by the unitary optical scanning unit 47 at the reading operation position Pd1 to read the document images. Then, the document sheets S after the image reading are ejected by the paired sheet ejection rollers 52*e* and 52*f* into the sheet ejection tray 53.

The separation unit 52*a*, the plurality of conveyance rollers 52*b*, 52*c*, and 52*d*, and the paired sheet ejection rollers 52*e* and 52*f* constitute a first conveyor 50 together with a plurality of sensors disposed on the document feed path 52 and a controller performing a conveyance control based on detection information form the sensors. Accordingly, the first conveyor 50 takes in the document sheets S from the document table 51, and conveys reversely the document sheets S such that the document sheets S pass through the reading operation position Pd1, and then ejects the document sheets S into a stack area on the sheet ejection tray 53 as a sheet ejection area outside the document table 51. The plurality of sensors may be publicly-known sensors including a proper sheet feed position sensors, a contact sensor, a document width sensor, a reading entry sensor, a registration sensor, an ejection sensor, and the like, for example. These sensors are disposed in sequence from upstream to downstream sides of the conveyance direction of the document sheets S. As a matter of course, the normal document sheets S are PPC or any other easy-to-bend sheets that are capable of forming image recording surfaces.

The document feed path 52 constitutes a main part of a straight conveyance path 61 that is inclined and extended along the DF exposure glass 42 in a predetermined downstream-side conveyance section ranging from the nip positions of the conveyance rollers 52*c* and 52*d* on the upstream side of the DF exposure glass 42 to the ejection port 56.

Figure 6:
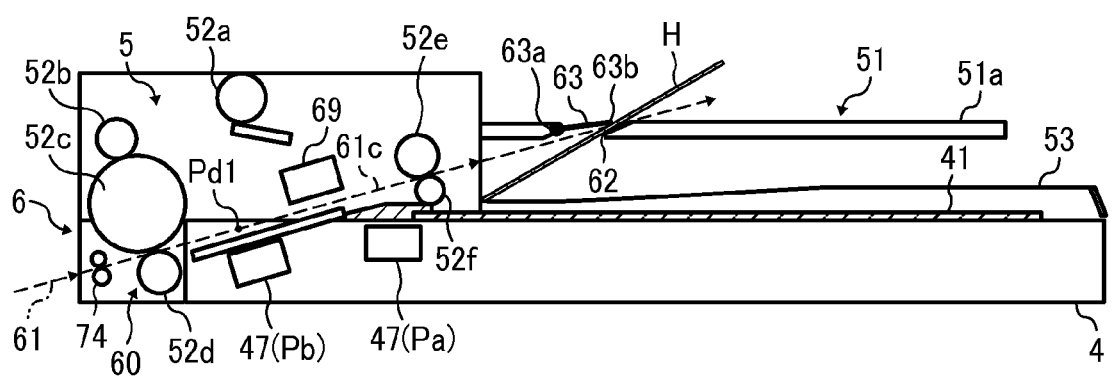
FIG. 6 is an illustration of a sheet ejection state when a small-sized card-type hard document is read by the image forming apparatus including the sheet conveyance device according to the first embodiment of the present disclosure.

As illustrated in FIG. 6, the straight conveyance path 61 conveys a hard sheet with a higher bending rigidity than the normal document sheets S, in particular, a small-sized hard sheet H along a plane inclined in parallel to the top surface of the DF exposure glass 42. When being conveyed in the straight conveyance path 61, the hard sheet H passes through the predetermined reading operation position Pd1 on the DF exposure glass 42.

The small-sized hard sheet H here is a standard-sized card made of resin (or cardboard), for example, driver's license, ID card (identify card), transportation card, or the like. Accordingly, the small-sized card here has a size of ID-1, ID-2, or ID-3 under ISO/IEC 7810 as international standards specifying the shape of identity cards, for example, or has a similar size. However, the short-direction width of the card is set to be smaller than the short-direction width of the minimum-sized one of standard-sized cut sheets to be set on the document table 51.

The plurality of conveyance rollers 52*c* and 52*d* and the paired sheet ejection rollers 52*e* and 52*f* in the straight conveyance path 61 constitute a second conveyor 60 together with a plurality of sensors disposed on the straight conveyance path 61 and a controller performing a conveyance control based on detection information from these sensors. Accordingly, the second conveyor 60 takes in the small-sized hard sheet H from one end of the straight conveyance path 61 and ejects the hard sheet H conveyed along the straight conveyance path 61 from the other end of the straight conveyance path 61 as the sheet ejection area side.

Meanwhile, the document table 51 as a sheet mount has a hard sheet ejection port 62 to let through at least the leading edge portion of the small-sized hard sheet H along the sheet ejection direction in the vicinity of a specific point intersecting with an ejection reference face 61*c* of the straight conveyance path 61 shown by a broken-line arrow in FIG. 1.

The ejection reference face 61*c* of the straight conveyance path 61 is an inclined plane that passes through the predetermined reading operation position Pd1 and is parallel to the top surface of the DF exposure glass 42.

The hard sheet ejection port 62 has an opening width Wo (refer to FIG. 3) smaller than the width of the maximum-sized document sheet S mountable on the document table 51 along a line of intersection between an extension of a plane corresponding to the ejection reference face 61c and the sheet mount surface 51a of the document table 51.

The opening width Wo is, for example, equal to or less than the short-direction width of the minimum-sized document sheet S out of a plurality of kinds of standard-sized cut sheets mountable on the document table 51, and takes a value with which the maximum-sized one of standard-sized cards can be ejected in the longitudinal direction. That is, the opening width Wo of the hard sheet ejection port 62 along the sheet width allows passage of the maximum-sized one of the standard-sized cards for use as hard sheets H, and is set to be equal to or less than the minimum sized of the normal standard-sized cut paper sheets.

The document table 51 is provided with a cover sheet guide 63 (movable guide) capable of opening and closing the hard sheet ejection port 62.

The sheet guide 63 has a support shaft 63a supported in a pivotally rotatable manner relative to the document table 51 at the front side (left side in FIG. 1) of the direction of document feed from the document table 51. The sheet guide 63 is constantly biased toward a first rotation position P1 (first guide position) in FIG. 1 by its own weight, and is located at the first rotation position P1 by contacting a leading edge portion 63b with an inner periphery 51b of the document table 51 forming the hard sheet ejection port 62. That is, the sheet guide 63 is a movable guide that can be rotated (moved in the rotation directions) to the first rotation position P1 and a second rotation position P2 shown by virtual lines in FIG. 1.

While the first conveyor 50 is operating, the sheet guide 63 is in a plate shape or a comb shape to form sheet guide faces 63c and 63d on the both upper and lower sides at the first rotation position P1 (shown by solid lines in the enlarged view of a portion of FIG. 1) where the hard sheet ejection port 62 is closed.

At the first rotation position P1, the sheet guide 63 guides by the upper sheet guide face 63c the specific-width section of the document sheet S on the document table 51 together with the sheet mount surface 51a of the document table 51. At the first rotation position P1, the sheet guide 63 also guides by the lower sheet guide face 63d the normal document sheets S ejected from the ejection port 56 by the paired sheet ejection rollers 52e and 52f to the sheet ejection tray 53 side. That is, at the first rotation position P1, the sheet guide 63 guides the document sheets S to be ejected or the relatively easy-to-bent hard sheet H in the direction away from the hard sheet ejection port 62.

A sheet guide face 51g is formed under the document table 51 on the both sides of the hard sheet ejection port 62 in the document width direction to cooperate with the sheet guide face 63d under the sheet guide 63.

Meanwhile, the sheet guide 63 is located at the second rotation position P2 (second guide position) to open the hard sheet ejection port 62 when the small-sized hard sheet H is ejected from the ejection port 56.

Specifically, when the hard sheet H is ejected by the paired sheet ejection rollers 52e and 52f, the sheet guide 63 is pushed upward by the hard sheet H guided to the lower end portion (guide or the like) of the document feed path 52 to open the hard sheet ejection port 62 (refer to FIG. 2). At the second rotation position P2, the sheet guide 63 guides by the lower sheet guide face 63d the leading edge portion of the hard sheet H along the sheet ejection direction ejected from the straight conveyance path 61, such that the hard sheet H switches by the lower sheet guide face 63d from the inclined posture during the sheet ejection illustrated in FIG. 2 to the inclined posture after completion of sheet ejection illustrated in FIG. 6. That is, at the second rotation position P2, the sheet guide 63 guides the high-bending rigidity hard sheets H to be ejected in the direction that enters into the hard sheet ejection port 62.

The configuration of rotating the sheet guide 63 to the first rotation position P1 and the second rotation position P2 is not limited to the weight of the sheet guide 63. For example, an elastic member such as a spring may be used between the sheet guide 63 and the document table 51. That is, the elastic member may be used to bias the sheet guide 63 lightly in a cover-closing direction in which to close constantly the hard sheet ejection port 62. In this case, when the high-bending rigidity hard sheet H is ejected from the straight conveyance path 61, the hard sheet H rotates the sheet guide 63 in a cover-opening direction against the biasing force of the elastic member. Accordingly, the high-bending rigidity hard sheet H opens the hard sheet ejection port 62 to expose at least its leading edge portion on the document table 51.

The sheet guide 63 is preferably located at an angle and a position where returning of the hard sheet H can be easily restricted in the direction opposite to the sheet ejection direction. In addition, the sheet guide 63 preferably has an appropriate coefficient of friction on the contact surface relative to the hard sheet H. In this configuration, in the case where the ejection drive motor is to be reversely operated immediately after ejection of the document, even when the relatively easy-to-bent document sheet is manually set in the straight conveyance path 61, it is possible to prevent the document sheet from becoming caught in the paired sheet ejection rollers 52e and 52f.

The ejection drive motor needs to be reversely operated, for example, in the case where the ejection drive motor for driving the paired sheet ejection rollers 52e and 52f is also used to drive or lift a pickup roller for picking up the document sheet S from the normal document bundle on the document table 51. In this case, the ejection drive motor may be driven to return the pickup roller to its home position immediately after sheet ejection.

A card supply unit 70 with a card supply port 71 is provided at the upper end of the straight conveyance path 61.

The card supply unit 70 has a rotational card supply tray 73 (refer to FIG. 2) capable of opening and closing the card supply port 71, a card pickup roller 74 (refer to FIG. 6), and a card conveyance passage 75 that guides conveyance of cards and the like as the small-sized hard sheets H, for example.

The card supply tray 73 is normally closed to constitute part of a side wall surface of the cover 55 of the ADF 5, and can be stopped at an opening position to open the card supply port 71 as illustrated in FIG. 2.

The card pickup roller 74 enters the hard sheet H set in the card supply tray 73 or the manually mounted hard sheet H into the straight conveyance path 61.

The card conveyance passage 75 is a conveyance path ranging from the card supply port 71 to the nip portions of the conveyance rollers 52c and 52d at the DF exposure glass 42 side, and joins with the document feed path 52 at the upstream side of the DF exposure glass 42.

The conveyance reference face of the card conveyance passage 75 is flush with the ejection reference face 61c of the straight conveyance path 61.

Accordingly, the card conveyance passage 75 forms a passage with the same reference face as that of the straight conveyance path 61 at the upstream side of the straight conveyance path 61. The straight conveyance path 61 is a card conveyance passage that extends flat from the card supply port 71 to the ejection port 56 in parallel to the DF exposure glass 42.

A second reading unit 69 is provided to constitute part of the upper guide face of the straight conveyance path 61 in the middle of the straight conveyance path 61 at the downstream side of the predetermined reading operation position Pd1 on one side of the first reading unit 45.

The second reading unit 69 is a back face reading unit that, after the first reading unit 45 reads by the first reading unit 45 a front face image from either the document sheet S or the small-sized hard sheet H, reads a back face image from the document sheet S or the small-sized hard sheet H.

The second reading unit 69 is arranged in almost the same manner as the unitary optical scanning unit 47 of the first reading unit 45 and has a back surface scanning area extended in the main scanning direction. Accordingly, the second reading unit 69 can read an image from the back surface of the document sheet S or the small-sized hard sheet H conveyed in the sub-scanning direction to pass through the back surface scanning area.

When no back face image is to be read, the document sheet S and the small-sized hard sheet H pass over the reading position in the second reading unit 69 without image reading, and the second reading unit 69 merely serves as part of the guide forming the straight conveyance path 61.

A second reading roller may be provided to suppress lifting of the document sheet S or the small-sized hard sheet H at a position under the straight conveyance path 61 and opposed to the second reading unit 69. In addition, the second reading roller may have a white reference face for shading correction to correct output variations such as light source variations or sensor sensitivity variations.

As described above, in the digital multifunction peripheral 1 of this embodiment, when the normal document sheets S are mounted on the document table 51, the first conveyor 50 conveys the top document sheet S through the document feed path 52, and the first reading unit 45 reads an image from the front face of the document sheet S. When duplex image reading is needed, the second reading unit 69 reads a back face image from the document sheet S. Meanwhile, the hard sheet H such as a card is set in the card supply tray 73 or is manually mounted, the hard sheet H is conveyed through the straight conveyance path 61 and an image is read from the front or back surface of the hard sheet H.

Next, operations of the digital multifunction peripheral 1 of this embodiment will be described.

While the digital multifunction peripheral 1 is in the shutdown state, the first reading unit 45 is rested at its home position Pa illustrated in FIG. 1, for example.

When the document sheet S is set on the document table 51, the document sheet S is detected by a document detection sensor and/or a size detection sensor, and the ADF 5 becomes operational in the DF scanner mode. At that time, the first reading unit 45 moves from the home position Pa to the DF document reading position Pb under the DF exposure glass 42 and stops in the second reading posture.

Then, when the user operates a switch to provide an instruction for starting of reading of a document image, the conveyance drive motor and sensors of the ADF 5 are activated. The document sheet S is entered into the document feed path 52 and conveyed through the document feed path 52, and the front face image is read from the document sheet S passing on the DF exposure glass 42 according to the document conveyance state.

As a preset document conveyance condition, when a duplex document is specified and duplex image reading is required, the first reading unit 45 performs front face image reading from the document sheet S and the second reading unit 69 performs back face image reading from the document sheet S. That is, the first reading unit 45 performs one-pass simultaneous duplex reading.

When the document sheet S after image reading is ejected by the paired sheet ejection rollers 52*e* and 52*f*, the normal document sheet S is highly flexible PPC or the like and thus is guided from its leading edge side by the document table 51 and the cover sheet guide 63 to the sheet ejection tray 53.

The conveyance operation in the DF scanner mode is repeatedly performed until all of the normal document sheets S set on the document table 51 are ejected. Then, upon completion of the conveyance operation in the DF scanner mode, the first reading unit 45 returns to the home position.

When the user operates a switch to provide an instruction for starting reading of the document image while the document sheet S is mounted on the flat head exposure glass 41, an operation is executed in the flat head scanner mode. Specifically, according to the switch operation, the first reading unit 45 moves from the home position Pa to the lower side of the flat head exposure glass 41, and the unitary optical scanning unit 47 performs line scanning by each small movement distance to read the front face image from the document sheet S. Then, upon completion of the flat head scanner operation, the first reading unit 45 returns to the home position Pa.

Meanwhile, when the card supply tray 73 is rotated into the open position as illustrated in FIG. 2 and the hard sheet H is set on the card supply tray 73, the hard sheet H is detected by the hard document detection sensor and the ADF 5 becomes operational in the DF scanner mode corresponding to the hard sheet H.

At that time, the first reading unit 45 moves from the home position Pa to the DF document reading position Pb under the DF exposure glass 42 and stops in the second reading posture.

Then, when the user operates a switch to provide an instruction for starting reading of an images from the hard sheet H, the conveyance drive motor and the sensors in the ADF 5 are activated and the hard sheet H is entered into the straight conveyance path 61 and conveyed in a straight line. According to the document conveyance state, the front face image is read from the hard sheet H passing on the DF exposure glass 42.

As a preset document conveyance condition, when a duplex document is specified and duplex image reading is required, the first reading unit 45 performs front face image reading from the document sheet S and the second reading unit 69 performs back face image reading from the hard sheet H. That is, the first reading unit 45 performs one-pass simultaneous duplex reading.

Upon completion of the image reading, the hard sheet H is ejected by the paired sheet ejection rollers 52*e* and 52*f* from the ejection port 56 to the sheet ejection tray 53.

At that time, when the hard sheet H is a resin card with a sufficiently high bending rigidity, the hard sheet H conveyed by the paired sheet ejection rollers 52*e* and 52*f* in the sheet ejection direction pushes upward the sheet guide 63 to open the hard sheet ejection port 62 as illustrated in FIG. 2.

At that time, the sheet guide 63 at the second rotation position P2 guides the leading edge portions of the hard sheet H along the sheet ejection direction ejected from the straight conveyance path 61 of the second conveyor 60 at the lower side, such that the hard sheet H switches from the inclined posture during the sheet ejection illustrated in FIG. 2 to the inclined posture after completion of the sheet ejection illustrated in FIG. 6.

Meanwhile, when the document to be ejected is not a card with a sufficiently high bending rigidity, the document to be ejected is ejected to the sheet ejection tray 53 by the paired sheet ejection rollers 52e and 52f without pushing upward the sheet guide 63 as illustrated in FIG. 5, in almost the same manner as in the case of the normal document sheet S.

The conveyance operation in the DF scanner mode for hard sheets as described above is repeatedly performed until all of the hard sheets H set on the card supply tray 73 are ejected or while the card supply tray 73 is opened. Then, upon completion of the conveyance operation in the DF scanner mode, the first reading unit 45 returns to the home position.

As described above, in this embodiment, the document table 51 has the hard sheet ejection port 62 to let through at least the leading edge portion of the hard sheet H along the sheet ejection direction ejected from the second conveyor 60. Therefore, at least the leading edge portion of the ejected hard sheet H along the sheet ejection direction passes through the hard sheet ejection port 62 and becomes exposed on the document table 51. This eliminates the need to separate the straight conveyance path 61 and the document table 51 in the vertical direction.

Accordingly, it is possible to provide the image reading device 6 (sheet conveyance device) that allows straight conveyance without increase in device height, and provide the digital multifunction peripheral 1 including the image reading device 6 with excellent operability and image quality.

In this embodiment, the hard sheet ejection port 62 has the opening width Wo smaller than the width of the minimum-sized sheet along the direction of intersection between an extension of the ejection reference face of the straight conveyance path 61 in the sheet ejection direction and the sheet mount surface 51a of the document table 51. Therefore, even when the pair of right and left movable side guide plates 54 is positioned in correspondence with the short-direction width of the minimum-sized document sheet S, the hard sheet H can be reliably ejected without interfering with the side guide plates 54.

As a matter of course, the opening width Wo may be increased by forming appropriate recessed portions such as clearance grooves in the side guide plates 54 such that the inner wall surface is spaced apart from the hard sheet ejection port 62.

In this embodiment, the cover sheet guide 63 capable of opening and closing the hard sheet ejection port 62 is attached to the document table 51, and the document sheet S on the document table 51 or the document sheet S to be ejected can be correctly guided in a predetermined sheet ejection direction.

In particular, the sheet guide 63 is rotatable to guide or hold the rear surface of the leading edge portion of the hard sheet H to be ejected. Accordingly, even when the paired sheet ejection rollers 52e and 52f are reversely rotated immediately after sheet ejection operation, it is possible to prevent effectively the document sheet S or the like from becoming caught in the paired sheet ejection rollers 52e and 52f.

In this embodiment, the sheet guide 63 guides the document sheet S on the document table 51 at the first rotation position P1 while the first conveyor 50 is operating, and guides the leading edge portion of the hard sheet H along the sheet ejection direction at the second rotation position P2 while the second conveyor 60 is operating. This allows favorable document sheet conveyance operations regardless of the conveyance mode of the ADF 5.

Second Embodiment

Figure 7:
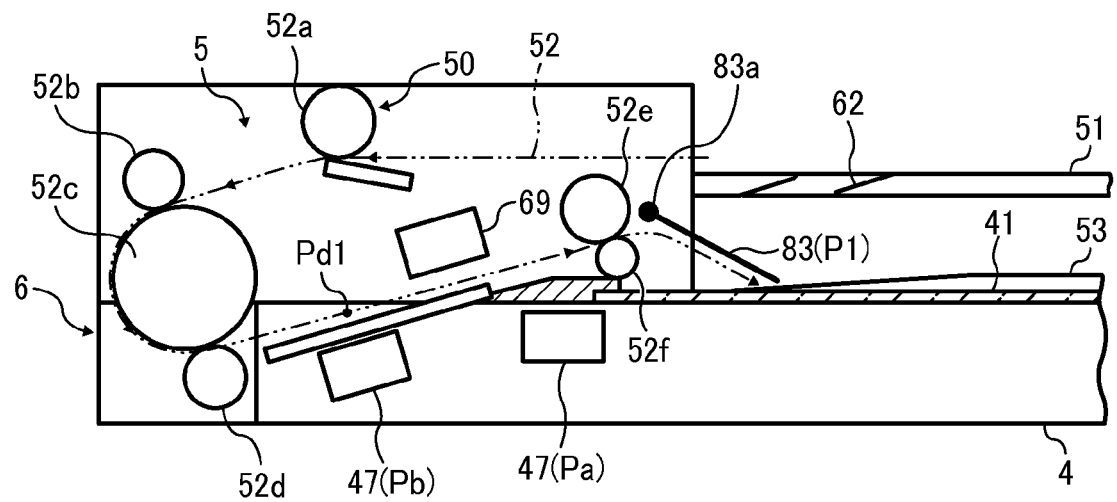
FIG. 7 is an illustration of a sheet ejection state when a normal document sheet is read by an image forming apparatus including a sheet conveyance device according to a second embodiment of the present disclosure.
Figure 8:
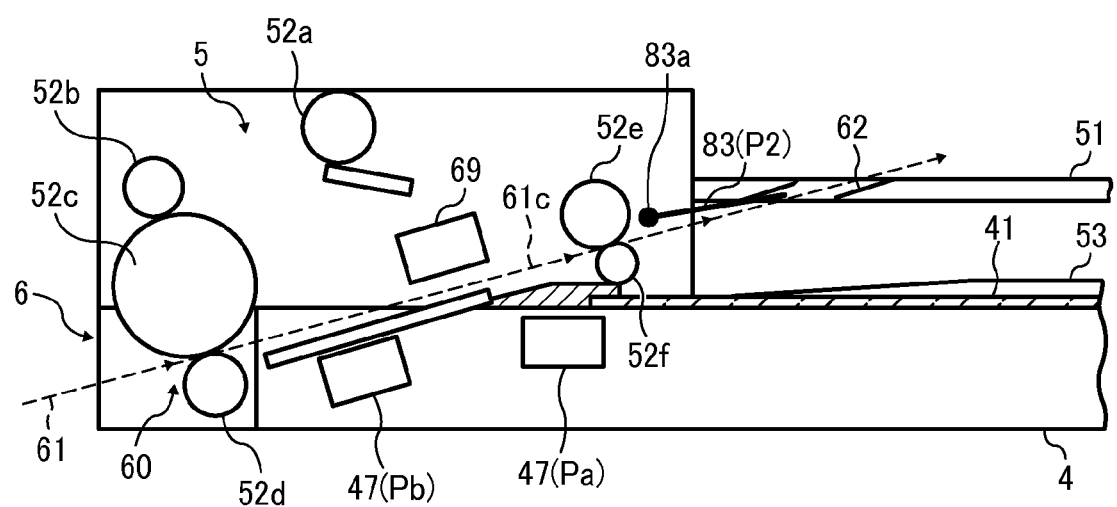
FIG. 8 is an illustration of a sheet ejection state when a small-sized card-type hard document is read by the image forming apparatus including the sheet conveyance device according to the second embodiment of the present disclosure.
Figure 9:
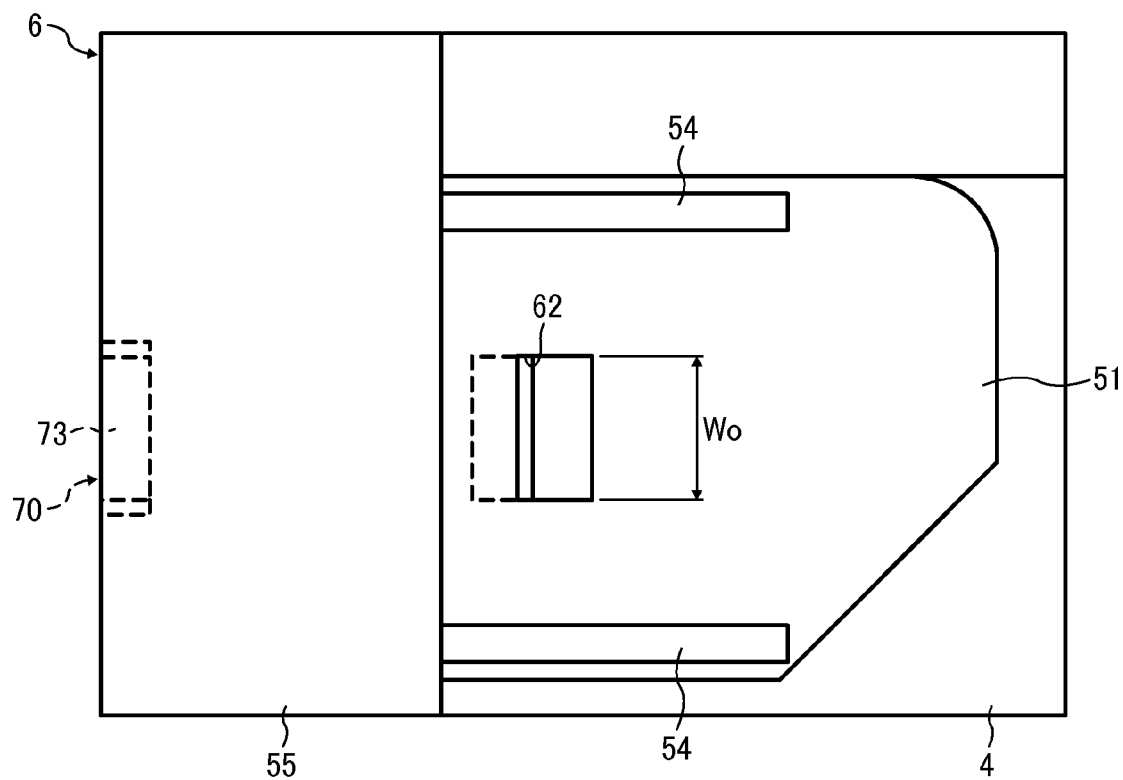
FIG. 9 is a top view of the image forming apparatus according to the second embodiment of the present disclosure.

FIGS. 7 to 9 illustrate a second embodiment of the present disclosure.

The second embodiment is entirely arranged in almost the same manner as the first embodiment. Accordingly, the same or similar components in the second embodiment as those in the first embodiment will be given the reference signs of the corresponding components in the first embodiment, and only points different from the first embodiment will be described below.

In the digital multifunction peripheral 1 of the second embodiment, the ADF 5 constituting the image reading device 6 is partially different from that in the first embodiment.

Specifically, in the first embodiment, the cover sheet guide 63 capable of opening and closing the hard sheet ejection port 62 is attached to the document table 51.

In contrast, in the second embodiment, a sheet guide 83 significantly capable of opening and closing the hard sheet ejection port 62 has a support shaft 83a pivotally supported in a rotatable manner relative to the cover 55 in the vicinity of the ejection port 56 of the ADF 5.

The sheet guide 83 is a movable guide that is rotatable into the first rotation position P1 illustrated in FIG. 7 and the second rotation position P2 illustrated in FIG. 8.

At the first rotation position P1, the sheet guide 83 guides the document sheets S or the relatively easy-to-bend card-sized documents to be ejected in the direction away from the hard sheet ejection port 62 and stacks the same on the sheet ejection tray 53.

At the second rotation position P2, the sheet guide 83 is pushed upward by the sufficiently high-bending rigidity hard sheet H to be ejected to guide the high-bending rigidity hard sheet H into the hard sheet ejection port 62.

The sheet guide 83 is formed in a plate shape or a comb shape.

At the first rotation position P1, the sheet guide 83 has no function to guide the document sheet S on the document table 51 but can guide properly the normal document sheet S into the sheet ejection tray 53.

The hard sheet ejection port 62 is a normally open slit extended in the width direction. Alternatively, a lightweight rotatable lid member may be provided to close the hard sheet ejection port 62 by its own weight and rotated by the hard sheet H toward the upper side of the document table 51.

In the second embodiment, the document table 51 also has the hard sheet ejection port 62 that lets through at least the leading edge portion of the hard sheet H along the sheet ejection direction ejected from the second conveyor 60. Therefore, at least the leading edge portion of the ejected hard sheet H along the sheet ejection direction is exposed on the document table 51 through the hard sheet ejection port 62, which eliminates the need to separate the straight conveyance path 61 and the document table 51 in the vertical direction. As a result, it is possible to provide the image reading device 6 that allows straight conveyance without increase in device height, and provide the digital multifunction peripheral 1 including the image reading device 6 with excellent operability and image quality.

In the second embodiment, the sheet guide 83 is rotatable into the first rotation position P1 and the second rotation position P2. Accordingly, when the hard sheet H has a high bending rigidity, the sheet guide 83 can eject the hard sheet H with the leading edge portion reliably exposed on the document table 51.

In the foregoing embodiments, the sheet guides 63 and 83 can be rotated and operated by the hard sheet H to be ejected. Alternatively, the sheet guides 63 and 83 may be slide types that can be easily driven in the open direction by the leading edge portion of the hard sheet to be ejected. In that case, the sheet guides 63 and 83 are preferably shaped so as to easily guide and hold the rear surface of leading edge portion of the hard sheet H.

The configuration of rotating the movable guide as a sheet guide into the first and second rotation positions P1 and P2 (first and second guide positions) is not limited to a biasing member such as its own weight or a light spring, but may be a configuration of rotating the lid member as a sheet guide by the use of an actuator.

In that case, the actuator is activated immediately before the hard sheet H is ejected from the straight conveyance path 61 or when the hard sheet H is entered into the straight conveyance path 61, for example. Then, the actuator rotates the sheet guide 63 into the second rotation position P2 to open the hard sheet ejection port 62. In addition, when the hard sheet H with at least the leading edge portion projected and exposed on the document table 51 is removed from the document table 51, the actuator may be used to rotate the sheet guide 63 into the first rotation position P1 as far as there is no subsequent hard sheet H.

In the foregoing embodiments, the predetermined reading operation position Pd1 is a specific operation position where image reading operation is performed to read a front image from the document sheet S or the hard sheet H. Alternatively, in the sheet conveyance device of the present disclosure, specific operations other than the image reading operation may be performed at the specific operation position.

As described above, the present disclosure provides the sheet conveyance device that allows straight conveyance without increase in device height, and provides the image reading device and the image forming apparatus including the conveyance device with excellent operability and image quality. The present disclosure is useful to all of sheet conveyance devices suited to conveyance of document sheets for image reading that allow straight conveyance operation for conveying difficult-to-bend sheets in a straight line.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A sheet conveyance device comprising:
   a sheet mount on which a sheet is mountable;
   a first conveyor to convey the sheet along a conveyance path from the sheet mount in a forward and then reverse direction to pass the sheet through an operation position, and to eject the sheet into a sheet ejection area; and
   a second conveyor to convey a relatively hard sheet, with a relatively higher bending rigidity than the sheet, along a relatively straight path passing through the operation position, and to eject the relatively hard sheet at an area other than the sheet ejection area,
   wherein the sheet mount includes a hard sheet ejection port to pass at least a leading edge portion of the relatively hard sheet to be ejected from the second conveyor in a sheet ejection direction, and wherein the hard sheet ejection port includes an opening width that is relatively smaller than a width of a sheet mounted on the sheet mount along a line of intersection between an extension of the plane in the sheet ejection direction and a sheet mount surface of the sheet mount.

2. An image reading device comprising the sheet conveyance device according to claim 1, wherein the image reading device is configured to perform an image reading operation to read an image from the sheet or the relatively hard sheet at the operation position.

3. An image forming apparatus comprising:
   the image reading device according to claim 2; and
   an image forming device to form an image to be output to an outside of the image forming apparatus, according to the image read with the image reading device.

4. A sheet conveyance device comprising:
   a sheet mount on which a sheet is mountable;
   a first conveyor to convey the sheet from the sheet mount along a first conveyance path to pass the sheet through a first position, and to eject the sheet into a sheet ejection area; and
   a second conveyor to convey a relatively hard sheet, with a relatively higher bending rigidity than the sheet, along a plane passing through the first position, and to eject the relatively hard sheet at a sheet ejection area side,
   wherein the sheet mount includes a hard sheet ejection port to pass at least a leading edge portion of the relatively hard sheet to be ejected from the second conveyor in a sheet ejection direction; and
   a movable guide, movable to a first guide position to guide the sheet or the relatively hard sheet away from the hard sheet ejection port and a second guide position to guide the relatively hard sheet in a direction toward the hard sheet ejection port.

5. The sheet conveyance device according to claim 4, wherein the movable guide is supported by the sheet mount.

6. The sheet conveyance device according to claim 4, wherein the movable guide, at a first rotation position where the hard sheet ejection port is closed, is configured to guide the sheet with the movable guide while the first conveyor is operating, and, at a second rotation position where the hard sheet ejection port is open, is configured to guide the leading end portion of the relatively hard sheet from the second conveyor while the second conveyor is operating.

7. The sheet conveyance device according to claim 6, wherein the movable guide is supported by the sheet mount.

8. An image reading device comprising the sheet conveyance device according to claim 6, wherein the image reading device is configured to perform an image reading operation to read an image from the sheet or the relatively hard sheet at the operation position.

9. An image forming apparatus comprising:
   the image reading device according to claim 8; and
   an image forming device to form an image to be output to an outside of the image forming apparatus, according to the image read with the image reading device.

10. The sheet conveyance device of claim 6, wherein the movable guide is biased in a direction to close the hard sheet ejection port.

11. An image reading device comprising the sheet conveyance device according to claim 4, wherein the image reading device is configured to perform an image reading operation to read an image from the sheet or the relatively hard sheet at the operation position.

12. An image forming apparatus comprising:
the image reading device according to claim 11; and
an image forming device to form an image to be output to an outside of the image forming apparatus, according to the image read with the image reading device.

13. The sheet conveyance device according to claim 4, wherein the hard sheet ejection port includes an opening width that is relatively smaller than a width of a maximum-sized sheet mounted on the sheet mount along a line of intersection between an extension of the plane in the sheet ejection direction and a sheet mount surface of the sheet mount.

14. An image reading device comprising the sheet conveyance device according to claim 13, wherein the image reading device is configured to perform an image reading operation to read an image from the sheet or the relatively hard sheet at the operation position.

15. An image forming apparatus comprising:
the image reading device according to claim 14; and
an image forming device to form an image to be output to an outside of the image forming apparatus, according to the image read with the image reading device.

16. The sheet conveyance device of claim 4, wherein the movable guide is biased in a direction to close the hard sheet ejection port.

17. The sheet conveyance device of claim of claim 4, wherein the first conveyor is configured to convey the sheet along the conveyance path from the sheet mount in a forward and then reverse direction to pass the sheet through the operation position, and to eject the sheet into a sheet ejection area.

* * * * *